(12) United States Patent
Dohmann et al.

(10) Patent No.: US 7,758,331 B2
(45) Date of Patent: Jul. 20, 2010

(54) PIPE SUPPORT SYSTEM

(75) Inventors: Heinrich Dohmann, Hoexter (DE); Reinhard Witt, Bad Oeynhausen (DE); Ralf Mickley, Bielefeld (DE); Norbert Kreth, Minden (DE)

(73) Assignee: American Maplan Corporation, McPherson, KS (US)

( * ) Notice: Subject to any disclaimer, the term of this patent is extended or adjusted under 35 U.S.C. 154(b) by 866 days.

(21) Appl. No.: 11/392,469

(22) Filed: Mar. 29, 2006

(65) Prior Publication Data

US 2007/0194484 A1 Aug. 23, 2007

Related U.S. Application Data

(60) Provisional application No. 60/775,646, filed on Feb. 22, 2006.

(51) Int. Cl.
*B29C 47/90* (2006.01)
(52) U.S. Cl. .................. 425/325; 425/70; 264/209.1; 264/209.3
(58) Field of Classification Search ............ 264/560, 264/209.1, 209.3, 209.4; 425/70, 325, 183, 425/190, 392, 403
See application file for complete search history.

(56) References Cited

U.S. PATENT DOCUMENTS 5,139,099 A * 8/1992 Hayashi et al. ............. 175/292
7,112,047 B2 * 9/2006 Schmuhl et al. ............... 425/68
2006/0034965 A1 * 2/2006 Ulrich et al. ................. 425/325
2006/0071372 A1 * 4/2006 Stieglitz et al. ............. 264/560
2006/0078641 A1 * 4/2006 Ulrich ......................... 425/392
2006/0240134 A1 * 10/2006 Stieglitz ..................... 425/325

FOREIGN PATENT DOCUMENTS

WO PCT/EP2004/005024 * 12/2004

* cited by examiner

*Primary Examiner*—Joseph S Del Sole
*Assistant Examiner*—Kimberly A Stewart
(74) *Attorney, Agent, or Firm*—Hamilton, Brook, Smith & Reynolds, P.C.

(57) ABSTRACT

Supporting device for a plastic profile (2), in particular for a plastic pipe, in a calibration device which has a supporting region (1), in which it supports the plastic profile (2), wherein the contour (3) in the supporting region (1) is adapted to the contour of the plastic profile (2). According to the invention, provision is made in that the contour (3) in the supporting region (1), in particular the radius (4), can be changed.

Furthermore, the invention relates to a process for changing a supporting region of a supporting device, in which the position of one or more series-arranged supporting devices with continuously changeable supporting region are changed as a function of a predetermined theoretical diameter such that the predetermined diameter is produced.

12 Claims, 3 Drawing Sheets

PIPE SUPPORT SYSTEM

RELATED APPLICATION

This application claims the benefit of U.S. Provisional Application No. 60/775,646, filed on Feb. 22, 2006. The entire teachings of the above application are incorporated herein by reference.

BACKGROUND

Supporting devices are known to the expert and are used generally in calibrators.

These supporting discs are exchanged when changing the product and replaced by discs having a different radius. This means in turn that correspondingly adapted supporting discs have to be available for each product to be produced. During pipe extrusion, discs are thus kept ready for different pipe diameters. This increases the stock requirement and the set-up time, since the discs are changed as described above.

SUMMARY

The invention provides a supporting device for a plastic profile, in particular for a plastic pipe, in a calibration device which has a supporting region, in which it supports the plastic profile, wherein the contour in the supporting region is adapted to the contour of the plastic profile.

The object of the invention is to offer a supporting device which makes it possible to dispense with expensive changing of the discs. Furthermore, the object is set to offer a corresponding process for dependent changing of the supporting region.

This object is achieved in that the contour in the supporting region, in particular the radius, can be changed. This may be achieved in that the supporting device is formed about a common point of rotation by combining several discs having different radius. Depending on which disc rests on the pipe, a different radius is brought into accord. Each disc may be employed individually via the common point of rotation.

In order to provide as far as possible continuous transition between the discs or the contour region of the discs, the individual discs in the supporting region are connected to one another and the supporting region forms a common surface, as a result of which the contour can be changed continuously. This may be, for example a metal sheet or the like.

By way of development it is proposed to design the supporting device in one piece, wherein each section through a common point of rotation has a different radius in the supporting region and the contour can be changed continuously.

So that the supporting device may be adjusted simply, provision is made to arrange an adjustment about the common point of rotation.

By way of advance, the adjustment has a mark, via which the set radius can be read. For use in a tank, this is facilitated from the outside, thus a seal against vacuum and against the cooling liquid is provided.

So that adjustment may be used in conjunction with the control of an extrusion plant, it is proposed that adjustment is effected electrically.

The supporting device with electrical adjustment is suitable in particular for adapting setting in an integrated measuring device, in particular an online measurement. If deviations from the theoretical diameter are established on the extruded pipe, the supporting device is adjusted accordingly in order to achieve the required theoretical diameter.

By way of solution with regard to the process, provision is made to change the position of a supporting region of a supporting device as a function of a predetermined theoretical diameter of one or more series-arranged supporting devices with continuously changeable supporting region such that the predetermined diameter is produced. It is particularly advantageous if this is effected as a function of a measured result on the extruded pipe.

It is thus possible to make adaptations at different points of the supporting region over the course of the calibration, so that at the end of the extrusion line, the pipe with the required diameter is produced exactly.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention. An exemplary embodiment of the invention is shown schematically in the drawings.

DETAILED DESCRIPTION

Figure 1:
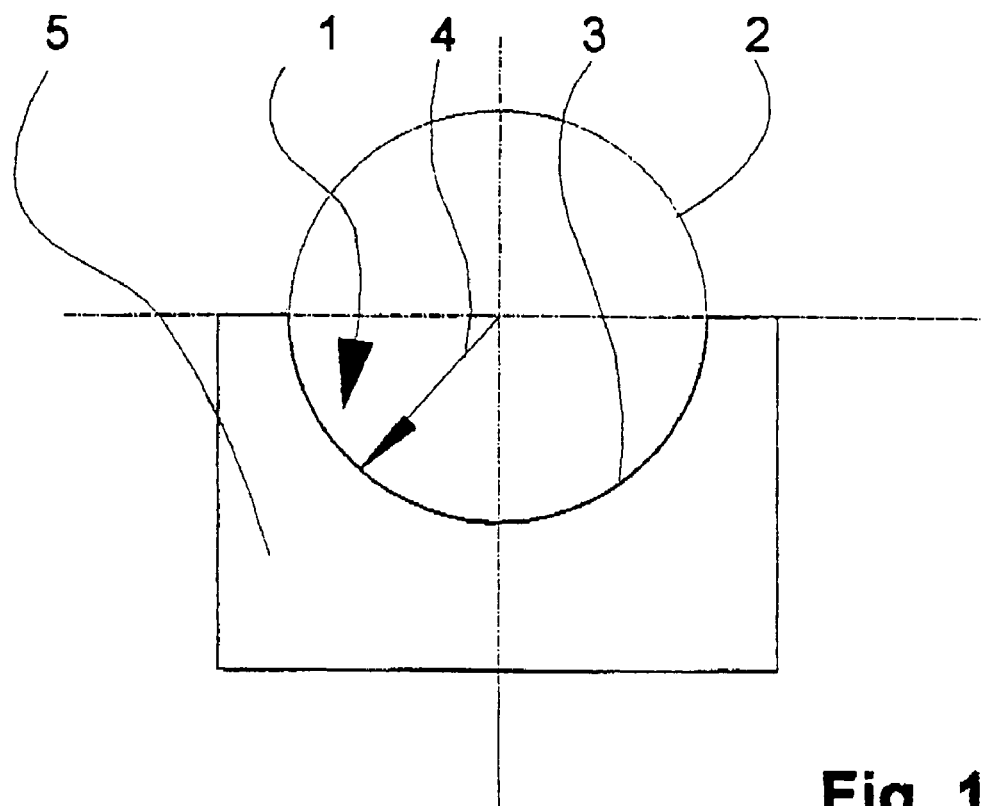
FIG. 1 shows a disc with a large radius
Figure 2:
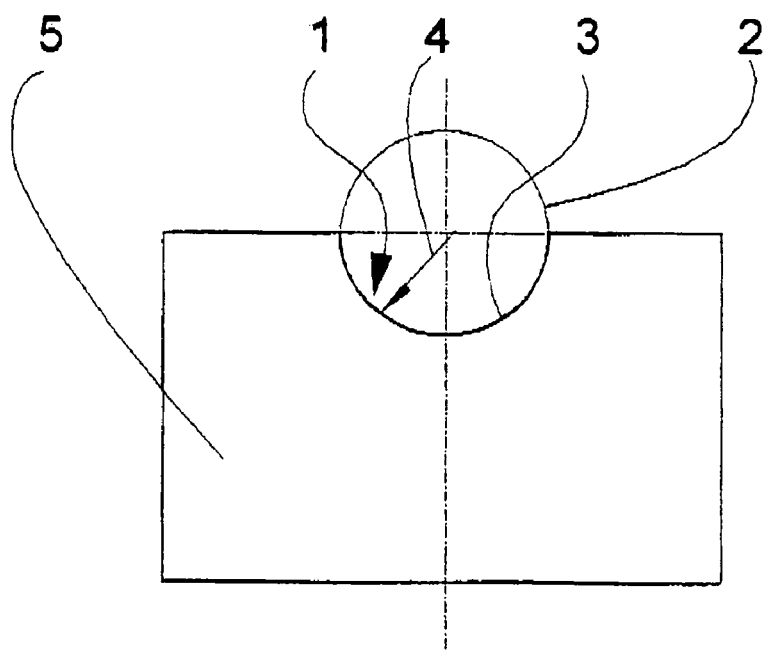
FIG. 2 shows a disc with a small radius

FIG. 1 shows a disc 5 with a supporting region 1, which reproduces a contour 3 with a certain radius 4 and supports a plastic profile 2. Such discs are used today in calibrators. FIG. 2 shows a similar disc 5 as in FIG. 1 with the difference that the radius 3 of contour 3 in the supporting region 1 differs from the radius 3 according to FIG. 1.

Figure 3:
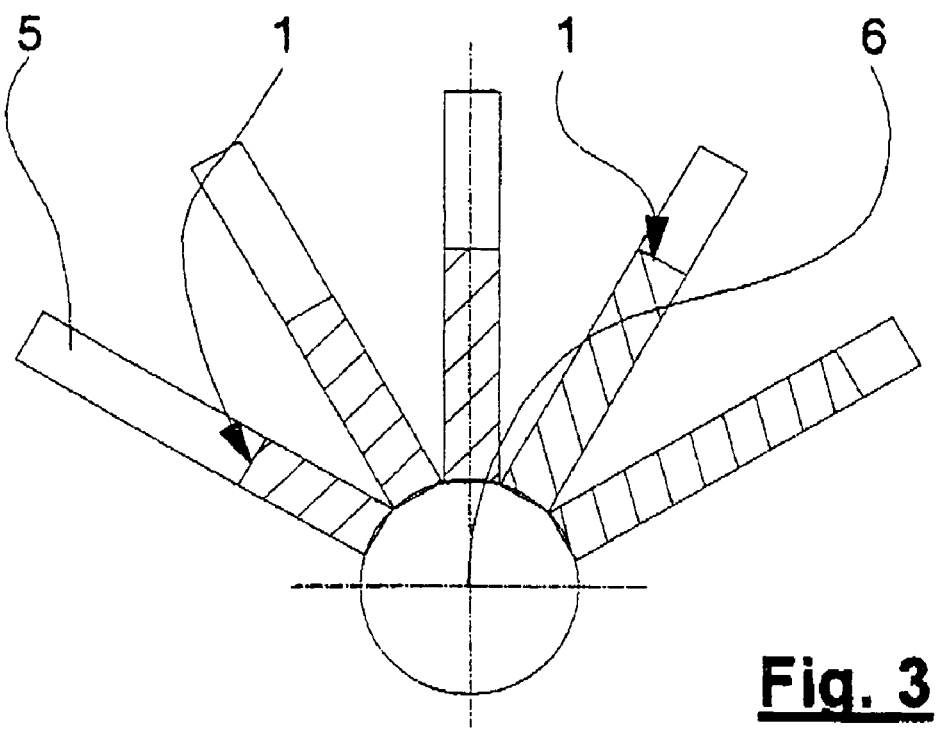
FIG. 3 shows the arrangement of several discs

Several of these discs 5 are shown in FIG. 3 about a common point of rotation 6, which is formed for example by a pipe. The supporting region 1 can be seen here in turn on each disc 5. This supporting region 1 is connected in FIG. 4 via a metal sheet, so that a common surface is produced, by means of which the supporting region is formed.

Figure 4:
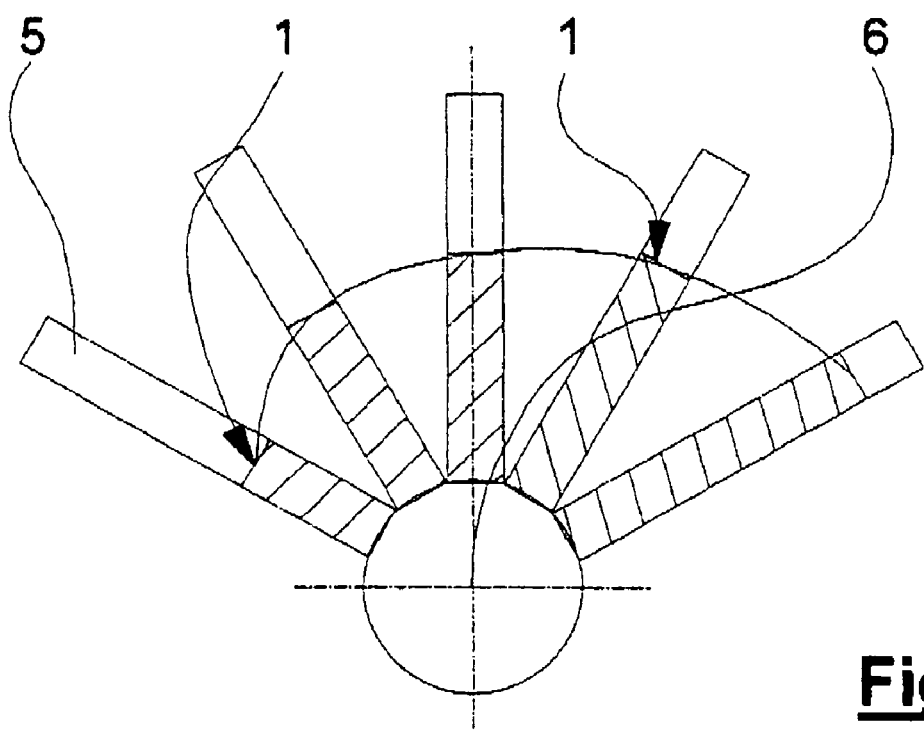
FIG. 4 shows FIG. 3 with a common surface
Figure 5:
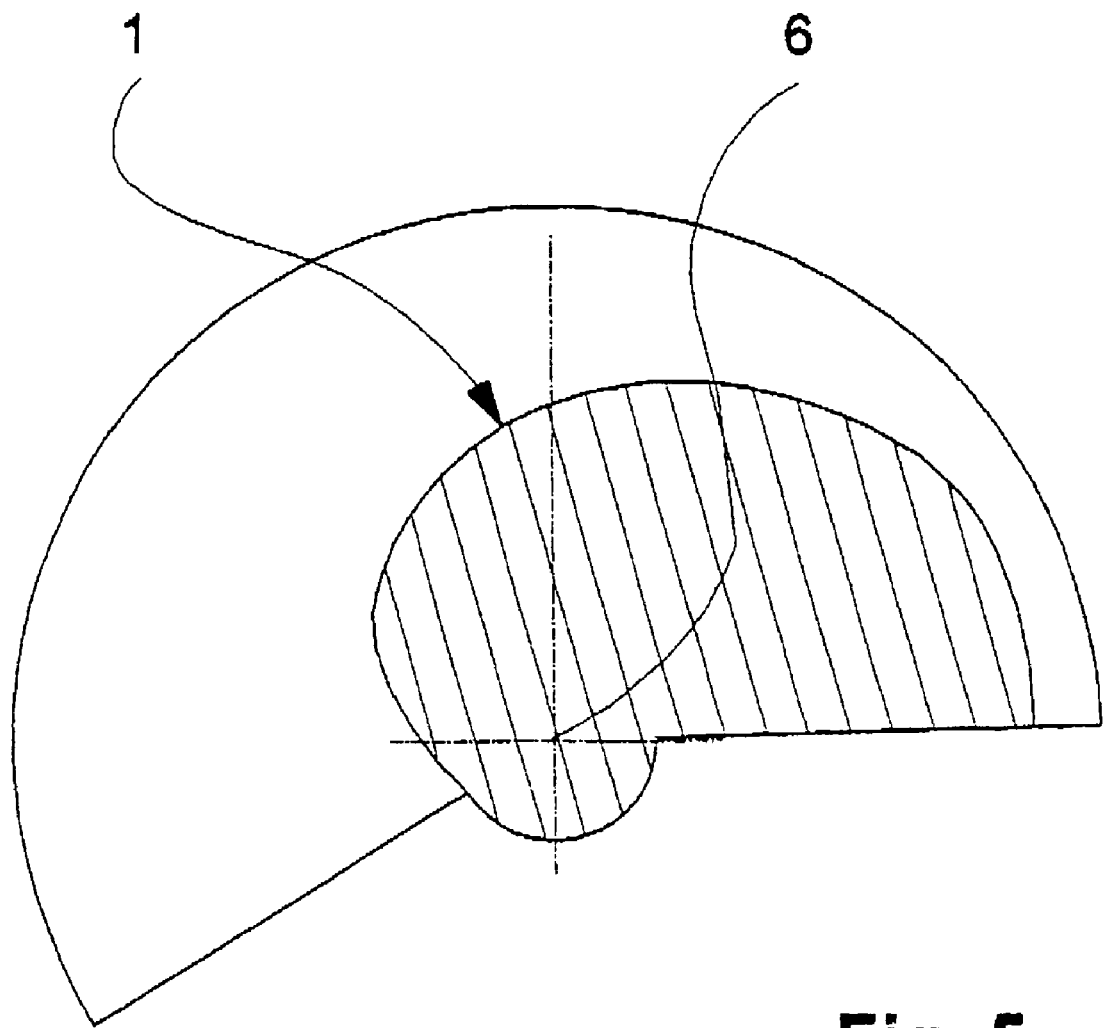
FIG. 5 shows the one-piece design

All individual parts according to FIG. 4 are realised as it were in a one-piece design according to FIG. 5. The supporting region 1 is formed here over a continuously changed surface. The gradient and hence the size of the radius change over the angle about the common point of rotation 6 can of course thus be employed individually and can be determined over the course of the curve. If a very large region is required, in which additionally a very fine change is necessary, the design according to FIG. 5 may also be designed as a full circle.

REFERENCE NUMBER LIST

1 Supporting region
2 Plastic profile
3 Contour
4 Radius
5 Disc
6 Common point of rotation While this invention has been particularly shown and described with references to particular embodiments thereof, it will be understood by those skilled in the art that various changes in form and details may be made therein without departing from the scope of the invention encompassed by the appended claims.

What is claimed is:

1. A supporting device for a plastic profile in a calibration device for an extrusion device, comprising a supporting region for supporting the plastic profile, a contour in the supporting region being adapted to contours of the plastic profile, the contour of the supporting region having more than one preformed unitary radius, each of a different size and configured for supporting and matching the contours of different sized plastic profiles and selectively located relative to each other around and fixed to a central common point of rotation, the supporting region being movable by rotation about the central common point of rotation for individually positioning a chosen preformed unitary radius that matches the contours of the plastic profile to support the plastic profile.

2. The supporting device according to claim 1 in which the supporting device is formed by combining several sections around the central common point of rotation, each having a different preformed unitary radius therein.

3. The supporting device according to claim 2 in which the individual sections in the supporting region are connected to one another and the supporting region forms a common surface, of which the contour can be changed continuously.

4. The supporting device according to claim 1 in which the supporting device is designed in one piece, wherein each section through the central common point of rotation has a different preformed unitary radius in the supporting region and the contour can be changed continuously.

5. The supporting device according to claim 1 in which the supporting device has an adjustment about the central common point of rotation.

6. The supporting device according to claim 5 in which a mark, via which the set radius can be read, is provided at the adjustment.

7. The supporting device according to claim 5 in which the adjustment is effected electrically.

8. The supporting device according the claim 2 in which the supporting device has an adjustment about the central common point of rotation.

9. The supporting device of claim 3 in which the supporting device has an adjustment about the central common point of rotation.

10. The supporting device of claim 4 in which the supporting device has an adjustment about the central common point of rotation.

11. A support device for a plastic profile in a calibration device for an extrusion device, comprising a support for supporting the plastic profile, the support including support surfaces having preformed unitary radius sizes each of a different size and configured for supporting and matching the contours of different sized plastic profiles that are selectively located relative to each other and positioned around and fixed to a central common point of rotation, the support being movable by rotation about the central common point of rotation for individually positioning a chosen preformed unitary radius size that matches the contours of the plastic profile to support the plastic profile.

12. The support device of claim 11 in which the support is adjusted about the central common point of rotation.

* * * * *